(12) United States Patent
Hashimoto et al.

(10) Patent No.: US 11,769,422 B2
(45) Date of Patent: Sep. 26, 2023

(54) INFORMATION PROCESSING DEVICE, ROBOT MANIPULATING SYSTEM AND ROBOT MANIPULATING METHOD

(71) Applicant: KAWASAKI JUKOGYO KABUSHIKI KAISHA, Hyogo (JP)

(72) Inventors: Yasuhiko Hashimoto, Kobe (JP); Masayuki Kamon, Akashi (JP); Shigetsugu Tanaka, Akashi (JP); Yoshihiko Maruyama, Osaka (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 54 days.

(21) Appl. No.: 17/267,447

(22) PCT Filed: Aug. 8, 2019

(86) PCT No.: PCT/JP2019/031479
§ 371 (c)(1),
(2) Date: Feb. 9, 2021

(87) PCT Pub. No.: WO2020/032207
PCT Pub. Date: Feb. 13, 2020

(65) Prior Publication Data
US 2021/0308582 A1    Oct. 7, 2021

(30) Foreign Application Priority Data

Aug. 10, 2018 (JP) .................................. 2018-151917
Jun. 5, 2019 (JP) .................................. 2019-105728

(51) Int. Cl.
*G09B 19/00* (2006.01)
*A63F 13/25* (2014.01)
(Continued)

(52) U.S. Cl.
CPC .............. *G09B 19/00* (2013.01); *A63F 13/25* (2014.09); *A63F 13/50* (2014.09); *A63F 13/67* (2014.09);
(Continued)

(58) Field of Classification Search
None
See application file for complete search history.

(56) References Cited

U.S. PATENT DOCUMENTS

2014/0064601 A1\* 3/2014 Ramachandran ...... B25J 9/1697
382/153
2015/0314440 A1\* 11/2015 Parker .................... B25J 9/1612
700/253
(Continued)

FOREIGN PATENT DOCUMENTS

JP   2012139746 A   7/2012
JP   2015533534 A   11/2015
(Continued)

*Primary Examiner* — Jason T Yen
(74) *Attorney, Agent, or Firm* — Studebaker & Brackett PC

(57) ABSTRACT

A robot manipulating system includes a game terminal having a game computer, a game controller, and a display configured to display a virtual space, a robot configured to perform a work in a real space based on robot control data, and an information processing device configured to mediate between the game terminal and the robot. The information processing device supplies game data associated with a content of work to the game terminal, acquires game manipulation data including a history of an input of manipulation accepted by the game controller while a game program to which the game data is reflected is executed, converts the game manipulation data into the robot control data based on a given conversion rule, and supplies the robot control data to the robot.

9 Claims, 11 Drawing Sheets

(51) Int. Cl.
  *A63F 13/50* (2014.01)
  *A63F 13/67* (2014.01)
  *B25J 9/00* (2006.01)
  *B25J 9/16* (2006.01)
  *B25J 13/00* (2006.01)
  *B25J 13/02* (2006.01)
  *B25J 13/06* (2006.01)
  *B25J 13/08* (2006.01)
  *B25J 19/02* (2006.01)

(52) U.S. Cl.
  CPC ............ *B25J 9/0081* (2013.01); *B25J 9/161* (2013.01); *B25J 9/163* (2013.01); *B25J 9/1605* (2013.01); *B25J 9/1661* (2013.01); *B25J 9/1671* (2013.01); *B25J 9/1697* (2013.01); *B25J 13/006* (2013.01); *B25J 13/02* (2013.01); *B25J 13/06* (2013.01); *B25J 13/065* (2013.01); *B25J 13/082* (2013.01); *B25J 13/088* (2013.01); *B25J 19/021* (2013.01)

(56) References Cited

U.S. PATENT DOCUMENTS

| | | |
|---|---|---|
| 2017/0028553 A1 | 2/2017 | Tsuda et al. |
| 2017/0039495 A1 | 2/2017 | Takehara et al. |
| 2018/0256989 A1* | 9/2018 | Adekunle ........... A63F 13/2145 |
| 2019/0369641 A1* | 12/2019 | Gillett .................. G05D 1/0027 |

FOREIGN PATENT DOCUMENTS

| | | |
|---|---|---|
| JP | 2015220574 A | 12/2015 |
| JP | 2017519644 A | 7/2017 |
| JP | 2018051652 A | 4/2018 |
| WO | 2014035640 A1 | 3/2014 |

\* cited by examiner

INFORMATION PROCESSING DEVICE, ROBOT MANIPULATING SYSTEM AND ROBOT MANIPULATING METHOD

TECHNICAL FIELD

The present disclosure relates to a technology which unites a computer game and an industrial robot.

BACKGROUND ART

Conventionally, a technology which combines a computer game and a robot which is an actual object is proposed. Patent Documents 1 and 2 disclose this kind of technology. Note that the "computer game" as used herein is a general term for a game which operates on a computer and is performed between the computer and an actual human being, and it is also referred to as a "video game" etc.

Patent Document 1 discloses that an industrial robot for welding and laser machining is provided with a game controller for a home computer game terminal as a controller for teaching and manipulational inputting. Correlation between the game controller to the industrial robot is performed through a well-known program using a personal computer which is commercially available.

Patent Document 2 discloses a system provided with a real space where a plurality of physical agents (for example, gaming robots such as vehicles and their accessories) exist, a controller which receives an operating command to the physical agent by a user input, and a host device which mediates between the physical agent and the controller. The system performs a game which causes the plurality of physical agents to compete in the real space (for example, a car racing game). A host device operates the physical agent so that a virtual space under the user's control and the real space maintain a real-time equivalence to change a state of the real space or change a state of the virtual space.

REFERENCE DOCUMENTS OF CONVENTIONAL ART

Patent Documents

[Patent Document 1] JP2012-139746A
[Patent Document 2] JP2015-533534A

DESCRIPTION OF THE DISCLOSURE

Problem(s) to be Solved by the Disclosure

A skillful game user can instantly grasp the state of the virtual space projected on a display of a computer-game terminal and input a corresponding command by operating the game controller intuitively and correctly. The present inventors have examined utilizing such game user's excellent skills as a resource for the industry.

Patent Document 1 describes an effect that the robot operator can manipulate the industrial robot like a game. However, since the robot operator actually sees the real space where the industrial robot performs a work, he/she more strongly feels like working rather than gaming.

In Patent Document 2, since the virtual space under the game user's control has the equivalence to the real space, the virtual space recognized by the game user never exceed the real space.

Originally, the game aims at amusement. For the game user, the game in which he/she feels like working lacks in interest, which may lead to lowering of his/her motivation. The present disclosure proposes a system in which a robot performs a work (labor) by a game user inputting a manipulation while playing a game, without spoiling the aspect of amusement in which the user can enjoy an unusual virtual space.

SUMMARY OF THE DISCLOSURE

An information processing device according to one aspect of the present disclosure mediates between a game terminal having a game computer configured to execute a game program, a game controller configured to accept an input of manipulation into the game computer, and a display configured to display a virtual space outputted from the game computer, and a robot configured to perform a work in a real space based on robot control data. The information processing device includes a game data feeding part configured to supply game data associated with the content of work to the game terminal, a game manipulation data acquiring part configured to acquire game manipulation data including a history of the input of the manipulation accepted by the game controller while the game program to which the game data is reflected is executed, a first converting part configured to convert the game manipulation data into the robot control data based on a given conversion rule, and a robot control data feeding part configured to supply the robot control data to the robot.

A robot manipulating system according to another aspect of the present disclosure includes a game terminal having a game computer configured to execute a game program, a game controller configured to receive an input of manipulation into the game computer, and a display configured to display a virtual space outputted from the game computer, a robot configured to perform a work in a real space based on robot control data, and the information processing device described above configured to mediate between the game terminal and the robot.

A method of manipulating a robot according to another aspect of the present disclosure is a method of manipulating the robot configured to perform a work in a real space based on robot control data by using a game terminal having a game computer configured to execute a game program, a game controller configured to accept an input of manipulation into the game computer, and a display configured to display a virtual space outputted from the game computer. The method comprising the steps of supplying game data associated with the content of work to the game terminal, acquiring game manipulation data including a history of the input of the manipulation accepted by the game controller while the game program to which the game data is reflected is executed, converting the game manipulation data into the robot control data based on a given conversion rule, and supplying the robot control data to the robot.

In the information processing device, the robot manipulating system, and the robot manipulating method which are described above, since the game manipulation data is converted into the robot control data based on the conversion rule, the contents of the computing game which the game user enjoys (i.e., characters, items, effects which appear in the virtual space of the game, the rule of the game, etc.) and the content of work performed by the robot do not need to be directly related to each other. That is, the virtual space projected on the display of the game terminal can be turned into the world unique to the game which is greatly different from the work performed by the robot in the actual world.

Therefore, the aspect of amusement of the game in which the unusual virtual space is appreciated is not spoiled.

Therefore, according to the information processing device, the robot manipulating system, and the robot manipulating method, the game user who is also the robot operator can make the robot work by the manipulation inputted during the game play, while purely enjoying the virtual world of the game.

Effect of the Disclosure

According to the present disclosure, a system is proposed, in which a robot performs a work by a game user inputting a manipulation while playing a game, without spoiling the aspect of amusement in which the user can enjoy an unusual virtual space.

MODES FOR CARRYING OUT THE DISCLOSURE

Next, one embodiment of the present disclosure is described with reference to the drawings.

Figure 1:
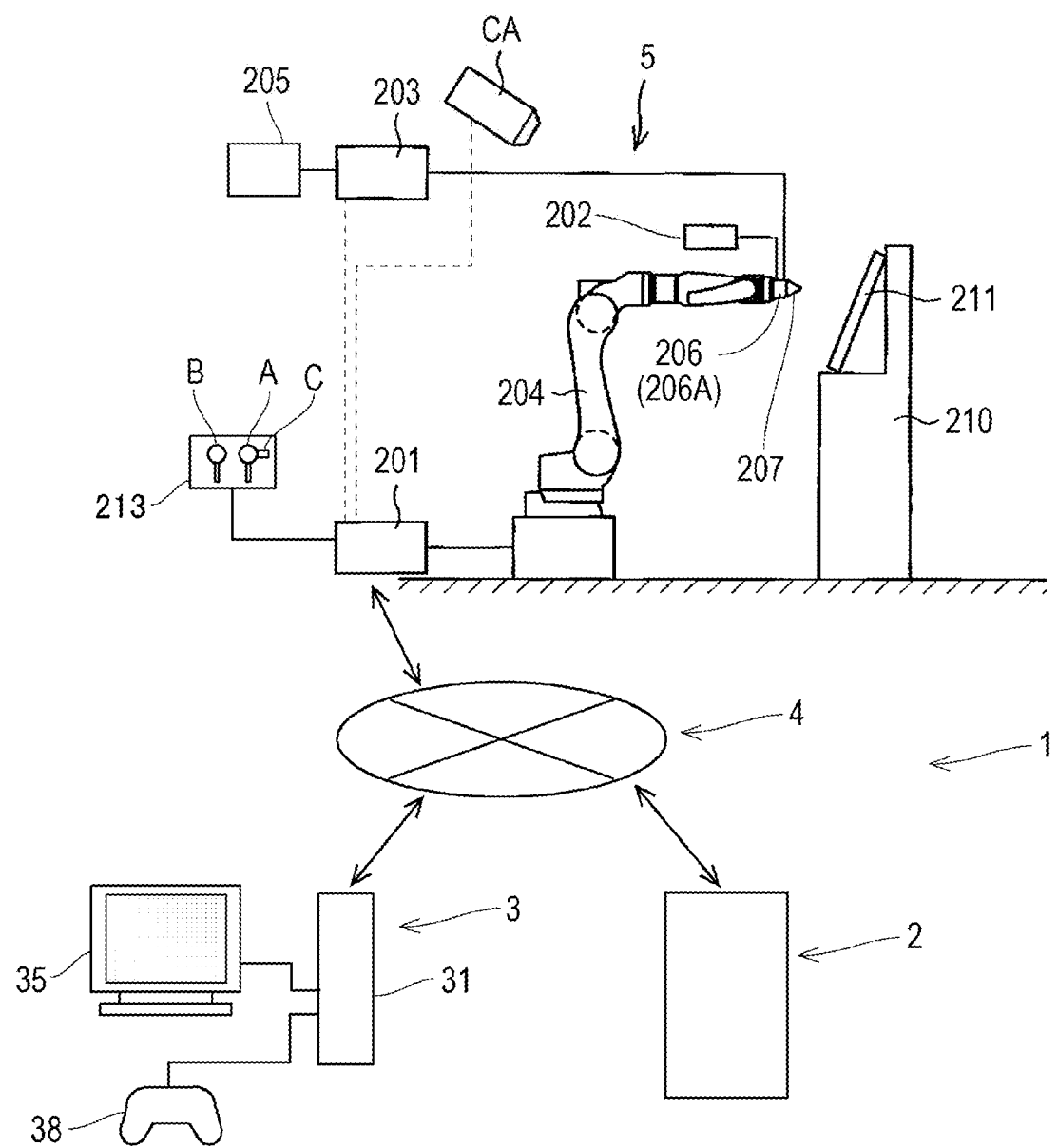
FIG. 1 is a block diagram illustrating the entire configuration of a robot manipulating system according to one embodiment of the present disclosure.

FIG. 1 is a block diagram illustrating a configuration of a robot manipulating system 1 according to one embodiment of the present disclosure. The robot manipulating system 1 includes a game terminal 3, a mediation server 2, a robot 5, and a communication apparatus 4. The communication apparatus 4 connects the game terminal 3 with the mediation server 2 so as to be communicatable to each other, and connects the mediation server 2 with the robot 5 so as to be communicatable to each other. The communication apparatus 4 may be a communication network, such as LAN, WAN, and the Internet. In this robot manipulating system 1, the game user is a game player who enjoys a computer game using the game terminal 3 and is a robot operator who manipulates the robot 5.

[Game Terminal 3]

The game terminal 3 includes a game computer 31, a game controller 38, a display 35, and a speaker 37. As the game terminal 3, a business-use gaming machine, a home video game terminal which uses a television set as a display, a portable crystalline-liquid game terminal, an information kiosk terminal, a smartphone, a tablet computer, a desktop computer, a laptop computer, etc. may be used. Here, one example in which the home video game terminal is adopted as the game terminal 3 is described.

Figure 2:
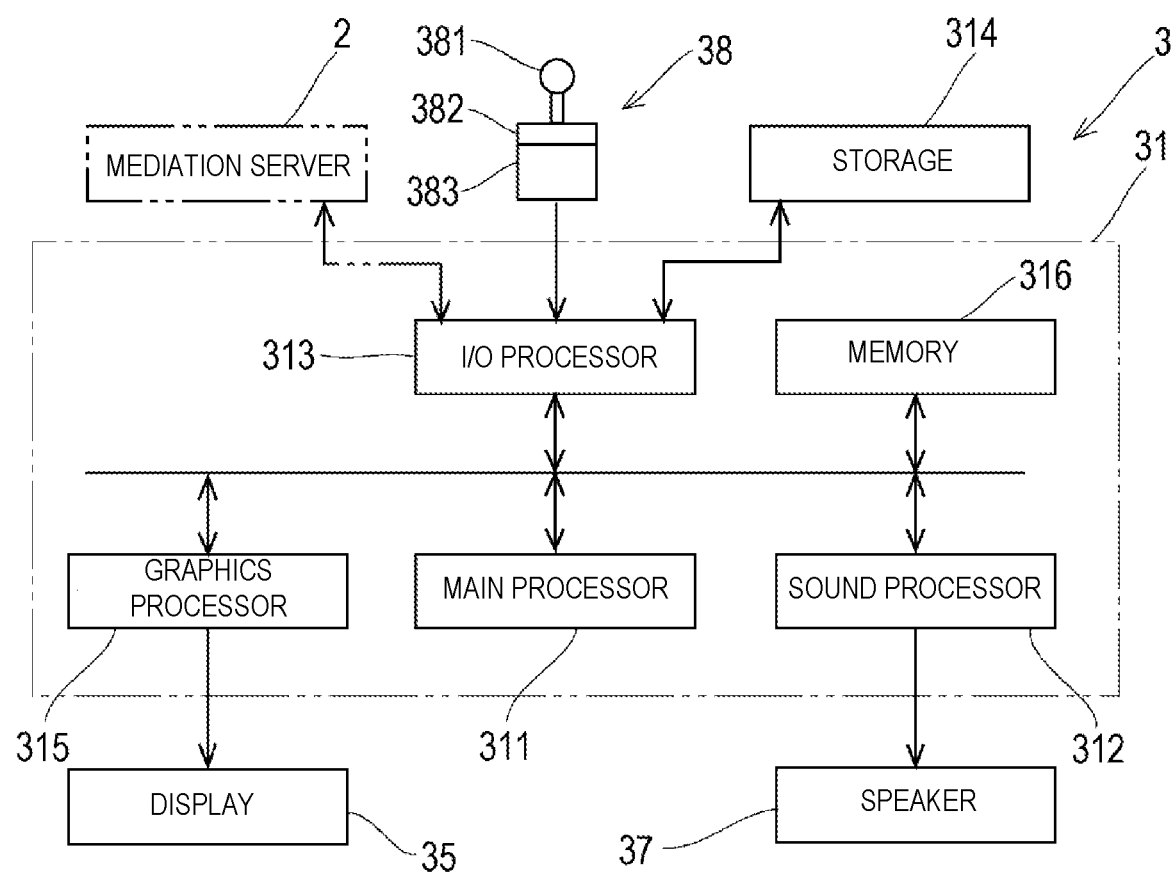
FIG. 2 is a block diagram illustrating a configuration of a game terminal.

FIG. 2 is a block diagram illustrating an outline configuration of the game terminal 3. As illustrated in FIG. 2, the game computer 31 of the game terminal 3 includes a main processor 311, a sound processor 312, an I/O processor 313, a graphics processor 315, and a memory 316. The sound processor 312 and the memory 316 are connected with the I/O processor 313 through an internal bus. The main processor 311 and the I/O processor 313 are connected to each other. The main processor 311 and the graphics processor 315 are connected to each other. The I/O processor 313 is connected with an I/O device, such as the game controller 38, through a serial interface (not illustrated). The I/O processor 313 communicates with an external device, such as the mediation server 2, through a communication interface (not illustrated).

The game terminal 3 can download a game program from the mediation server 2 by communicating with the mediation server 2. The game program and save data which are downloaded are stored in the memory 316. The game program and the save data may be stored in a storage 314.

The I/O processor 313 supplies to the main processor 311 a manipulation signal from the game controller 38 operated by the game user. The main processor 311 reads and executes the game program, and performs a given arithmetic operation. The graphics processor 315 performs a drawing (rendering) processing according to an instruction from the main processor 311 to generate frame data, and outputs a video signal to the display 35. The sound processor 312 decodes voice data according to an instruction from the main processor 311, and replays the data to output it to the speaker 37.

The main processor 311 creates game manipulation data based on the manipulation signal etc. inputted by the game user through the game controller 38, and passes it to the I/O processor 313. The I/O processor 313 transmits the game manipulation data to the mediation server 2. The game manipulation data includes at least identification information on the game program, game user's identification information, and a history of the manipulation inputted by the game user through the game controller 38 while playing the game.

The game controller 38 includes a manipulandum 381, a manipulation detector 382 which detects an operation amount of the manipulandum 381, and a communication device 383 which outputs the operation amount detected by the manipulation detector 382 to game computer 31 as a manipulation signal. For example, the manipulandum 381 may be one of known manipulanda, such as a touch display, a keyboard, a mouse, a cross key, a stick, a button, a ball, and a lever, or a combination of these.

Figure 3:
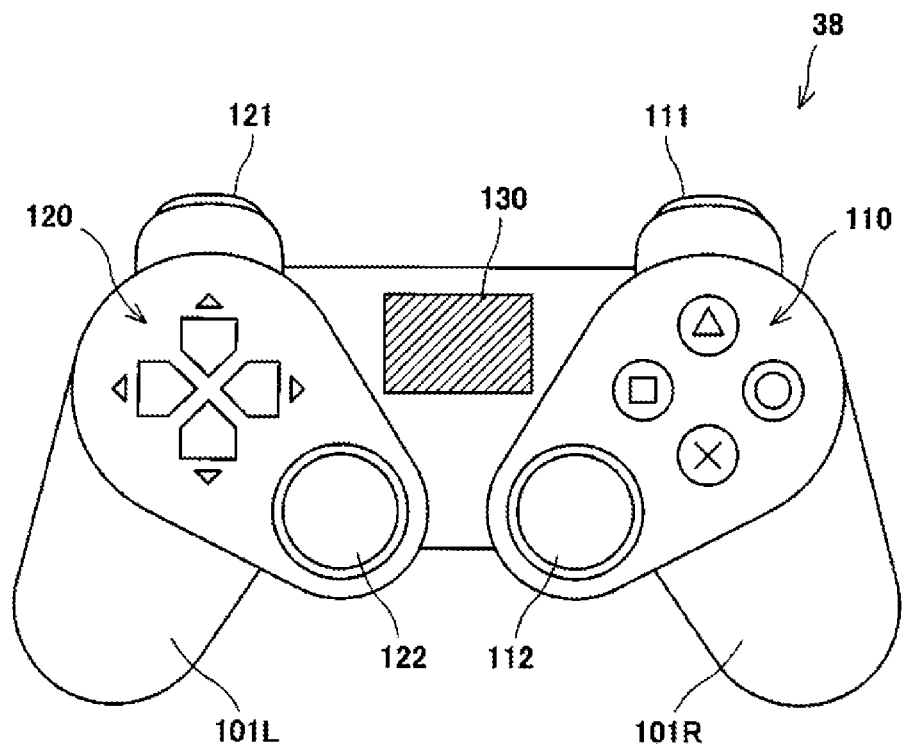
FIG. 3 is an appearance view of one example of a game controller.

FIG. 3 is an appearance view of one example of the game controller 38. The game controller 38 illustrated in FIG. 3 has a contour of a substantially U-shape. The game user grasps and operates handles 101L and 101R at both wing parts with both left and right hands. Operation button groups 110 and 120 and analog sticks 112 and 122 are provided in left and right upper surfaces of the game controller 38, and an R button 111 is provided in a front right surface of the game controller 38, an L button 121 is provided in a front left surface. The operation button group 110 and the analog stick 112 are operated with the game user's right thumb, and the operation button group 120 and the analog stick 122 are operated with the game user's left thumb. Moreover, the R button 111 and the L button 121 are operated with the game user's right index finger and left-hand index finger, respectively. The game controller 38 is further provided with a touch display 130 between the operation button group 110 and the operation button group 120.

[Robot 5]

The robot 5 is an industrial robot which is installed at a field, such as a factory, and performs a work in a real space, for example. Such an industrial robot includes a vertical articulated robot, a horizontal articulated robot, a parallel link robot, a polar coordinates robot, a cylindrical coordinates robot, and a rectangular coordinates robot. Note that, although a single robot 5 is illustrated in FIG. 1, the robot manipulating system 1 may be provided with a plurality of robots 5.

In this embodiment, a painting robot which performs a painting work is used as one example of the robot 5. The robot 5 includes a manipulator 204, an end effector 206 attached to a tip end of the manipulator 204, and a robot controller 201. The robot 5 further includes a robot manipulator 213 which accepts an input of manipulation to the robot 5 (in detail, the manipulator 204 and the end effector 206). The robot 5 may further include a robot vision (not illustrated). The robot controller 201 is communicatably connected with the manipulator 204, the end effector 206, and the robot manipulator 213. The robot controller 201 is provided with a computer, and by performing decoding and arithmetic processing of the program stored in the processor or various signals inputted from the robot manipulator 213 to govern a motion control of the manipulator 204, a motion control of the end effector 206, a signal output from various output ports, etc.

In this embodiment, the end effector 206 is a painting gun 206A. The painting gun 206A includes a nozzle 207, a paint feeder 202 which supplies paint to the nozzle 207, a compressor 205 which pumps compressed air to the nozzle 207, and a valve device 203 which adjusts a discharge amount of the paint from the nozzle 207 (including ON/OFF of the discharge). Operation of the valve device 203 is controlled by the robot controller 201.

A jig 210 which holds a workpiece 211 is disposed near the robot 5. Moreover, near the robot 5, an imaging device CA, which three-dimensionally images a workspace of the robot 5 including the jig 210, the workpiece 211, and the robot 5, is provided. The imaging device CA may image the workspace two-dimensionally. Imaging data generated by the imaging device CA is transmitted to the mediation server 2 through the communication apparatus 4.

[Mediation Server 2]

Figure 4:
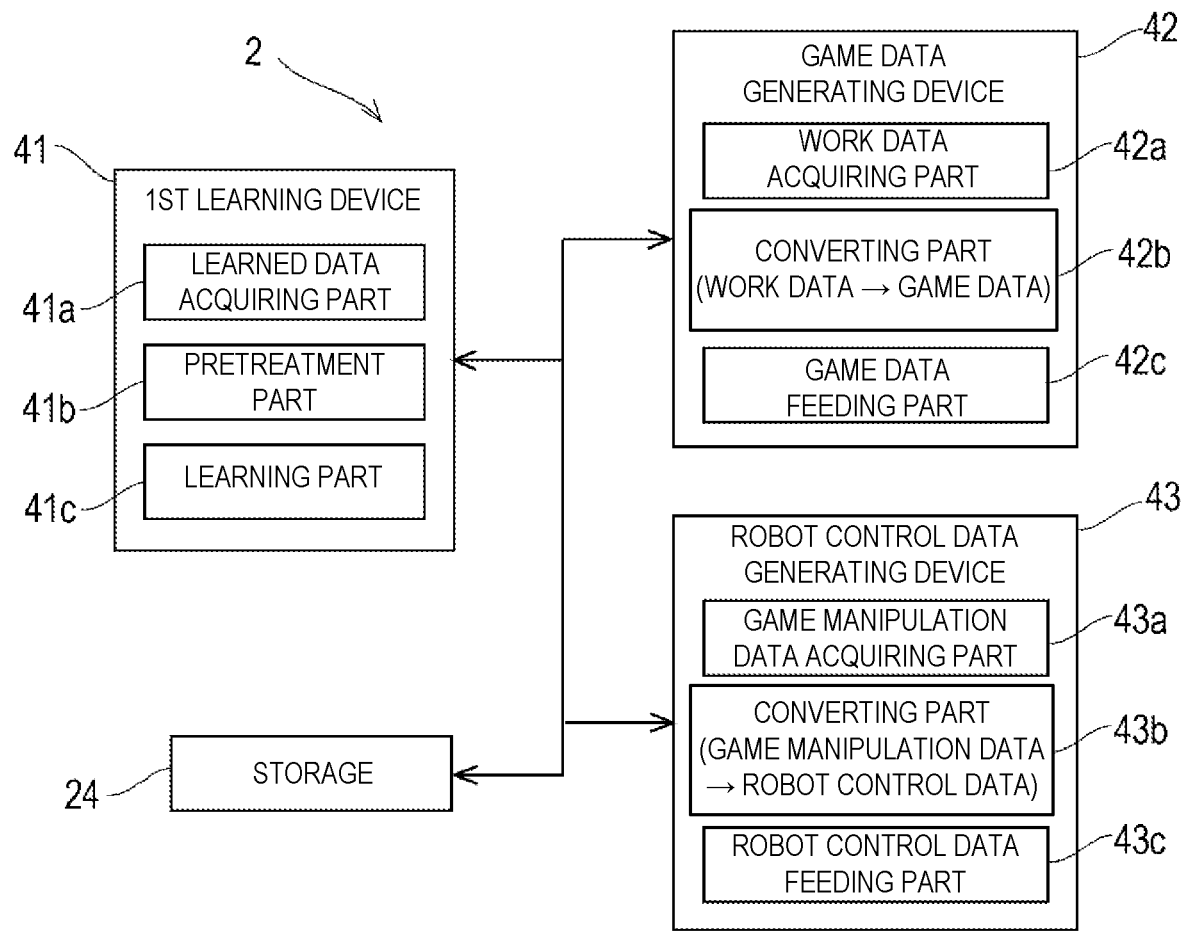
FIG. 4 is a functional block diagram of a mediation server.

FIG. 4 is a block diagram illustrating a configuration of the mediation server 2. As illustrated in FIG. 4, the mediation server 2 includes a first learning device 41, a game data generating device 42, a robot control data generating device 43, and a storage 24. The first learning device 41 creates a first learned model using A.I. (Artificial Intelligence) technology. The game data generating device 42 generates game data based on the work data, and provides it to the game terminal 3. The robot control data generating device 43 generates robot control data using the game manipulation data acquired from the game terminal 3, and provides it to the robot 5. The storage 24 stores data used by the mediation server 2, such as learned model, learned data, teacher data, game program, and game parameter.

Figure 5:
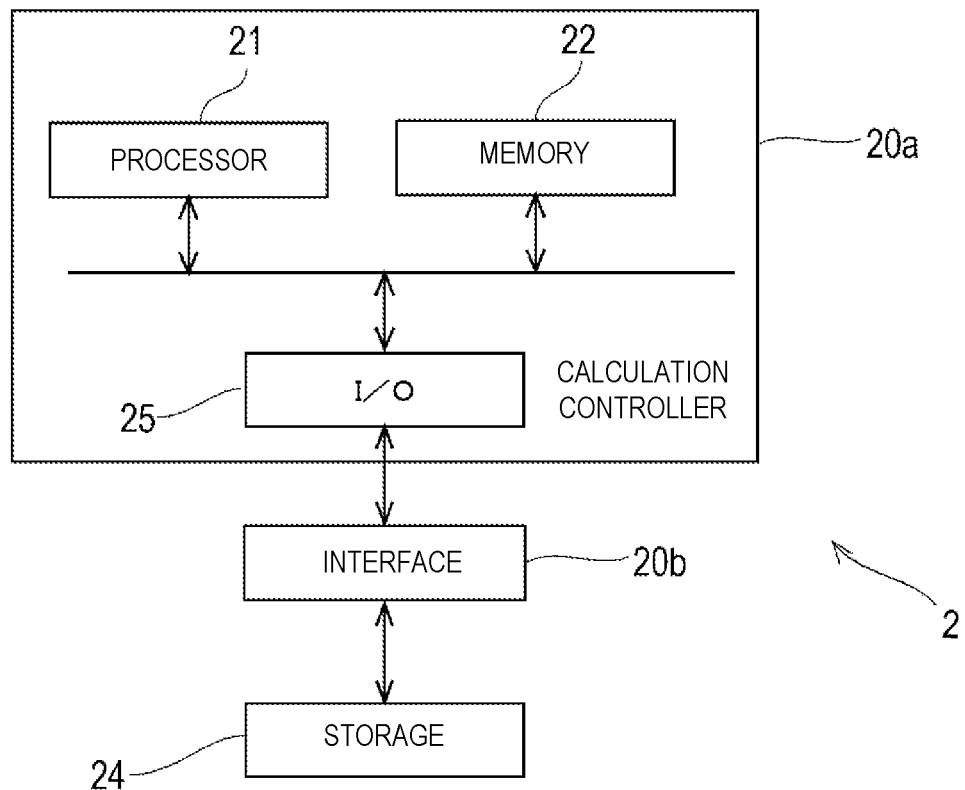
FIG. 5 is a block diagram illustrating a configuration of a computer which functions as the mediation server.

The mediation server 2 includes a calculation controller 20a and the storage 24. Each functional part of the mediation server 2 may be comprised of at least one calculation controller 20a, or two or more of a plurality of functional parts may be comprised of one calculation controller 20a. As illustrated in FIG. 5, each calculation controller 20a of the mediation server 2 includes a processor 21, a memory 22 such as a ROM and a RAM, and an I/O part 25. The storage 24 is connected with the calculation controller 20a through an interface 20b. The calculation controller 20a may be provided with a sole processor 21 which performs a centralized control, or may be provided with a plurality of processors 21 which perform a distributed control. For example, the calculation controller 20a may be comprised of at least one of a computer, a personal computer, a microcontroller, a microprocessor, a PLD (programmable logic device) such as an FPGA (field-programmable gate array), a PLC (programmable logic controller), and a logic circuit, or a combination of these. The memory 22 or the storage 24 stores a basic program, a software program, etc. executed by the processor 21. By the processor 21 reading and executing the program, the calculation controller 20a achieves a function configured in the software program.

The first learning device 41 includes functional parts of a learned data acquiring part 41a, a pretreatment part 41b, and a first learning part 41c. Learned data DB which stores learned data, teacher data DB which stores teacher data, and parameter DB which stores game parameters, are configured in the storage 24.

Figure 6:
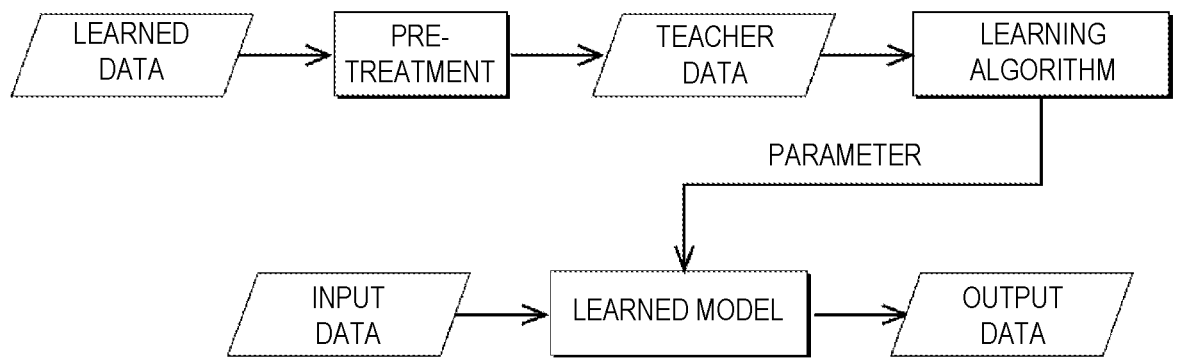
FIG. 6 is a view illustrating a flow of machine learning by a learning device.

FIG. 6 is a view illustrating a flow of machine learning by the learning device (first learning device 41). As illustrated in FIG. 6, the learned data acquiring part 41a acquires data to be used by the machine learning, such as the learned data. The pretreatment part 41b pretreats the learned data to create the teacher data. The pretreatment includes at least one of various processings such as a conversion of data format, an examination of abnormalities, an extraction of data, and a change in a variable identifier and a filename.

The first learning part 41c learns a correlation between input data and output data by the machine learning. In this embodiment, the input data is game manipulation data and the output data is robot control data. The first learning part 41c performs supervised learning as one example of a learning algorithm of the machine learning. Generally, the supervised learning is an approach of learning a correlativity model for estimating necessary output data for new input data by giving in advance a large quantity of known data set (referred to as "teacher data") of the input data and the output data corresponding to the input data, and discriminating a feature which suggests the correlativity between the input data and the output data based on the teacher data. Although the correlativity between the input data and the output data is substantially unknown when the learning algorithm is started, the first learning part 41c identifies the feature gradually as the learning progresses to interpret the correlativity. When the correlativity between the input data and the output data is interpreted to a level reliable to some extent, the learned result which is repeatedly outputted from the first learning part 41c can be used for estimating what kind of data the output data should become against the input data. That is, the first learning part 41c can gradually bring the correlativity between the input data and the output data close to an optimal solution with the progress of the learning algorithm.

In this embodiment, the first learning part 41c inputs the teacher data into a neural network and learns the relation between the input data and the output data. Various parameters set to the neural network are stored in the parameter DB. For example, the parameter DB stores the weight etc. of synapses in the learned neural network. The neural network where each parameter to be stored is set becomes the learned model.

Returning to FIG. 4, the game data generating device 42 includes a work data acquiring part 42a, a converting part 42b, and a game data feeding part 42c.

Figure 7:
FIG. 7 is a view illustrating a function of a game data generating device.

FIG. 7 is a view illustrating a function of the game data generating device 42. As illustrated in FIG. 7, the work data acquiring part 42a acquires work data from the robot 5 and the imaging device CA. The work data includes information on the content of a work, and information on the workpiece 211 which is a work target object. The information on the content of work may include the type of work such as machining, conveying, and painting, the type of the end effector 206 to be used for the work, and parts to be used for the work, such as a screw and paint, for example. The information on the workpiece 211 may include the type, shape, etc. of the workpiece 211, for example.

The converting part 42b generates game data by converting the work data by using a given conversion rule. The conversion rule is stored in the storage 24 in advance. The game data may include a game program to be executed at the game terminal 3. Moreover, when the game program is installed in the game terminal 3 in advance, the game data may include game parameters applied to the game program. The game data feeding part 42c supplies the generated game data to the game terminal 3.

Returning to FIG. 4, the robot control data generating device 43 includes a game manipulation data acquiring part 43a, a converting part 43b, and a robot control data feeding part 43c which outputs the robot control data.

Figure 8:
FIG. 8 is a view illustrating a function of a robot control data generating device.

FIG. 8 is a view illustrating a function of the robot control data generating device 43. As illustrated in FIG. 8, the game manipulation data acquiring part 43a acquires the game manipulation data from the game terminal 3. The converting part 43b generates the robot control data by converting the game manipulation data by using a given conversion rule. The robot control data may include position command information on the end effector 206 and operating command information on the end effector 206. The robot control data feeding part 43c supplies the generated robot control data to the robot 5. The robot 5 performs a work based on the acquired robot control data.

Application Example 1

Below, Application Example 1 in which the robot manipulating system 1 having the above configuration is applied to the robot 5 which performs a painting work is described.

Referring to FIG. 1, the robot 5 which performs the painting work is provided with the nozzle 207 of the painting gun 206A at a tip end of a hand. The robot manipulator 213 has a first lever A, a second lever B, and a button C. According to the operation inputted into the first lever A and the second lever B, the manipulator 204 operates to change the position of the nozzle 207.

The first lever A can accept an input of a command of a movement of the nozzle 207 in the left-and-right direction and the front-and-rear direction. A manipulation input signal value inputted by the first lever A changes continuously from 0 to 1 according to the operating position of the first lever A. The second lever B can accept an input of a command of a movement of the nozzle 207 in the up-and-down direction. A manipulation input signal value inputted by the second lever B changes continuously from 0 to 1 according to the operating position of the second lever B. The button C can accept an input of a command of a discharging amount of the paint. The manipulation input signal value inputted by the button C changes continuously from 0 to 1 according to the operating position of the button C.

Although the workpiece 211 which is the work target of the robot 5 having the above configuration is held by the jig 210, the posture and the shape are different for different workpieces 211. Since there is irregularity in the surface of the workpiece 211, the robot operator is required for high skill in order to paint this surface uniformly.

Figure 9:
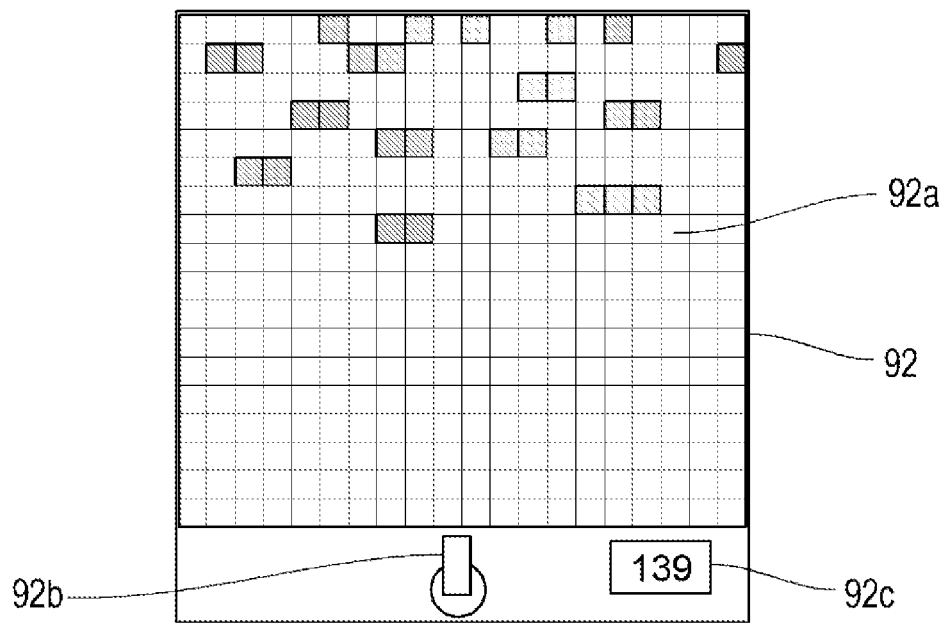
FIG. 9 is one example of a game screen displayed on a display of the game terminal in Application Example 1.

The game terminal 3 executes a game program of a drop game. FIG. 9 illustrates one example of a game screen 92 displayed on the display 35 of the game terminal 3. Not the real space where the robot 5 exists but a virtual space peculiar to the game is displayed on the game screen 92. In the game screen 92 illustrated in FIG. 9, 20 rows of lines 92a are displayed in a center part, and block(s) falls from the topmost part of each row by a given drop pattern. A shooting gun 92b as the game user's operation target item and a score 92c are displayed in a lower part of the game screen 92. The game user can operate the game controller 38 to input into the game computer 31 a command related to a shooting direction and a shooting timing of a bullet of the shooting gun 92b.

The game controller 38 is provided with a dial X and a button Y as the manipulanda 381. A manipulation input signal value of the dial X changes continuously from 0 to 1 with a turning angle of the dial X. The dial X can move the shooting gun 92b in the left-and-right direction of the game screen 92. The manipulation input signal value of the dial X corresponds to the shooting direction of the shooting gun 92b. The shooting direction of the shooting gun 92b is oriented toward the leftmost end of the screen when the manipulation input signal value of the dial X is 0, is oriented toward the rightmost end of the screen when the manipulation input signal value is 1, and is oriented toward the center of the screen in the left-and-right direction when the manipulation input signal value is 0.5. The manipulation input signal value of the button Y becomes a value of 0 or 1 depending on whether the button Y is pushed. The button Y can input a command of firing the bullet from the shooting gun 92b. That is, the bullet is fired in an instant by using the manipulation input signal value of the button Y being changed from 0 to 1 as a trigger. The bullet is not fired in other situations.

In the virtual space displayed on the game screen 92, the block under dropping is shot down by the bullet fired from the shooting gun 92b. When the bullet hits the falling object, the falling object disappears from the game screen 92. The mission is successful if all the blocks are shot down. The game user competes for the high score by achieving the score according to the success or failure of the mission, the number of the shot-down blocks, and the smallness of the moving amount of the shooting gun 92b in the left-and-right direction.

The drop pattern of the block in the game is determined by the game parameters. The game parameters are generated by the converting part 42b converting the work data into the game parameters. In this application example, the work data includes the painting as the content of work, the type of paint, and a three-dimensional image including the workpiece 211 and its perimeter obtained by the imaging device CA. The converting part 42b converts the surface shape of the workpiece 211 into the drop pattern of the blocks under the game play by using a given conversion rule to generate the game parameters reproducing the drop pattern.

Figure 10:
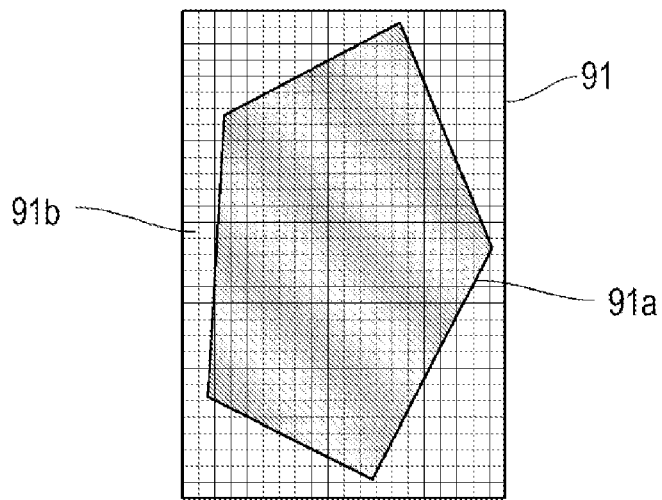
FIG. 10 is a view illustrating one example of work data in Application Example 1.

FIG. 10 is a view illustrating one example of the work data. For example, as illustrated in FIG. 10, the three-dimensional image (or two-dimensional image) including the workpiece 211 and its perimeter obtained by the imaging device CA is converted into a planer map 91 which is comprised of a given number of dots (in the example of FIG. 10, 20×30). In the map 91, "1" is assigned to the dot where the workpiece 211 exists (91a in FIG. 10), and "0" is assigned to the dot where the workpiece 211 does not exist (91b in FIG. 10). Further, each line of the map 91 is cut out and the lines are used as line data comprised of a plurality of continuous lines (in the example of FIG. 10, 30 lines). Then, the game parameters are generated for each line data so that the block appears only at the dot to which "1" is assigned.

The game parameters generated by the game data generating device 42 as described above are transmitted to the game terminal 3. The game computer 31 of the game terminal 3 applies the game parameters to the game program, and determines an appearing location and an appearing timing of the block to be displayed on the game screen 92 of the display 35. A filter which corrects the game parameters according to the game user's skill level acquired in advance may be set in the game computer 31. When the game begins, a block group corresponding to the first line first appears at the topmost part of the screen. The appeared block(s) falls at a given rate. The falling speed of the block(s) may differ according to the game user's skill level. When a given time passes after the block group corresponding to the first line appears, a block group corresponding to the second line appears at the topmost part of the screen. Thus, the block group of the line corresponding to the row number appears at the topmost part of the screen while incrementing the row number from the first line to the last line by 1 at a constant interval so that the appeared blocks fall one after another.

<Learning Method>

First, a learning method implemented by the first learning device 41 of the mediation server 2 is described.

A plurality of workpieces 211 are prepared for learning. The surface shape of the workpiece 211 for learning differs for different workpieces 211. A skilled robot operator inputs a manipulation, for each of a plurality of workpieces 211 for learning, by a work sequence optimal to the surface shape based on his/her experiences by using the robot manipulator 213. The robot controller 201 acquires the manipulation input signal which corresponds to an operation performed by the skilled robot operator on the robot manipulator 213, and stores, for each workpiece 211, the history of the manipulation input signal so as to be associated with the workpiece 211. For example, the history of the manipulation input signal for a certain workpiece 211 includes a number sequence An in which the manipulation input signal value of the first lever A is recorded at a unit-time interval, a number sequence Bn in which the manipulation input signal value of the second lever B is recorded at a unit-time interval, and a number sequence Cn in which the manipulation input signal value of the button C is recorded at a unit-time interval.

The game computer 31 of the game terminal 3 stores the history of the manipulation inputted by the game user while playing the game, from the start to the end of the game. From the history of the manipulation of the game user who has succeeded the mission and got the high score (hereinafter, referred to as the "high-score user"), a number sequence Xn in which the manipulation input signal value of the dial X is recorded at a unit-time interval is created, and a number sequence Yn in which the manipulation input signal value of the button Y is recorded at a unit-time interval is created.

For a certain workpiece Wm, the number sequence acquired from the history of the manipulation of the skilled robot operator is {Anm, Bnm, Cnm}. Moreover, during the game play to which the game parameters associated with this workpiece Wm are reflected, the number sequence acquired from the history of the manipulation of the high-score user is {Xnm, Ynm} (m=1, 2, . . . ). Thus, one learned data set is obtained from the history of the manipulation of the skilled robot operator associated with the workpiece Wm and the history of the manipulation of the high-score user.

The learned data acquiring part 41a acquires and stores a large number of learned data sets. The pretreatment part 41b pretreats the learned data set and generates the teacher data set. The first learning part 41c inputs the teacher data set into the neural network, and learns a relation between the number sequence {Xn, Yn} which is the input data and the number sequence {An, Bn, Cn} which is the output data. Various parameters set in the neural network are stored in the parameter DB. The neural network to which each parameter stored is set becomes the learned model.

<Robot Manipulating Method>

Next, a robot manipulating method using the above learned model is described.

Figure 11:
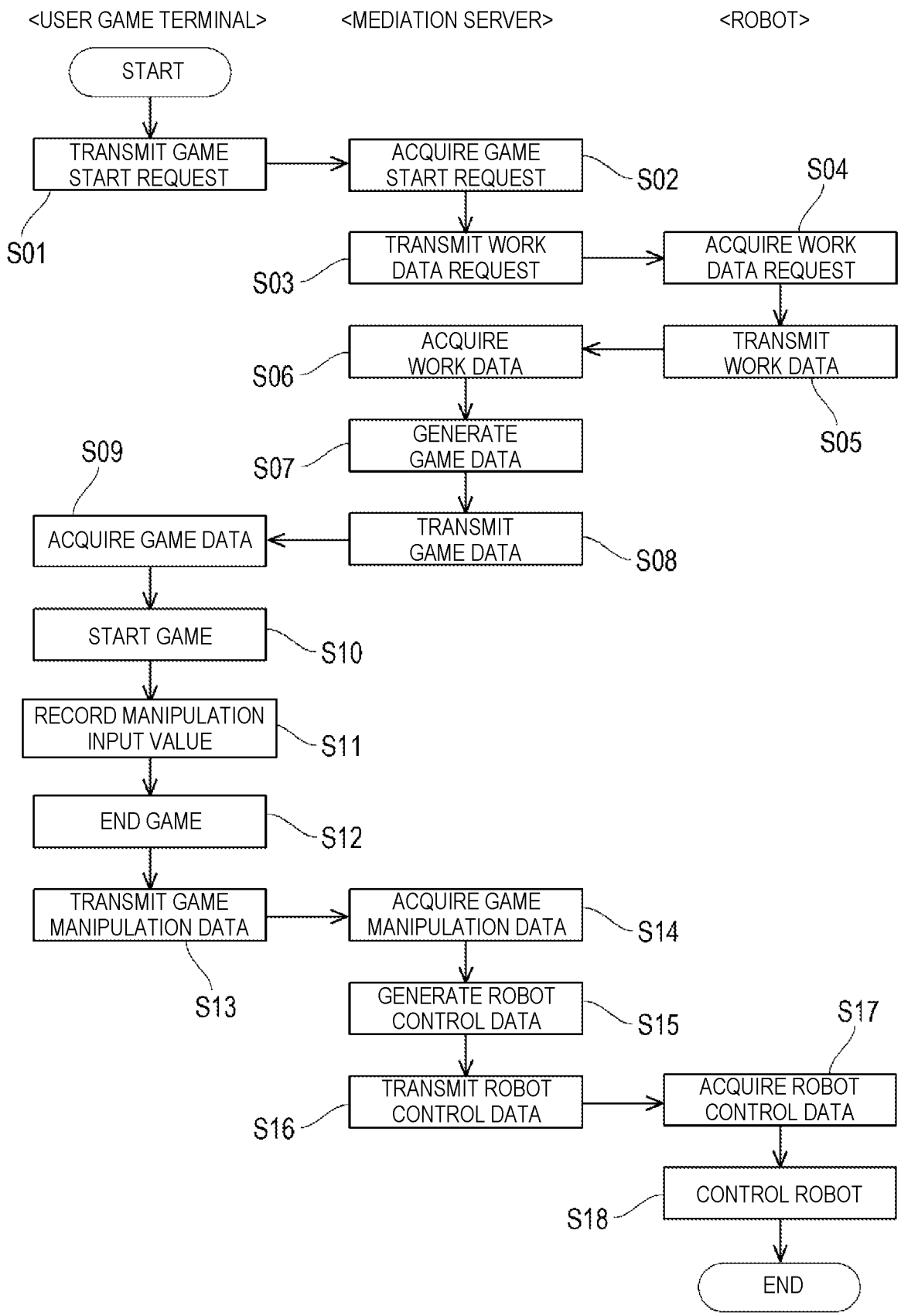
FIG. 11 is a flowchart of processing by a robot manipulating system.

FIG. 11 is a flowchart illustrating a flow of processing of a game method. FIG. 11 comprehensively illustrates a series of processings from the preparation for the start of the game in the robot manipulating system 1 until the robot 5 performs a work, where the left column indicates processing of the game terminal 3, the center column indicates processing of the mediation server 2, and the right column indicates processing of the robot 5.

The game terminal 3 transmits login information along with a game start request to the mediation server 2 upon the start of the game (Step S01). The login information includes a game user ID etc. When the game start request is acquired (Step S02), the mediation server 2 transmits a work data request to the robot 5 (Step S03). When the work data request is acquired (Step S04), the robot 5 transmits the work data to the mediation server 2 in response to the acquisition (Step S05). In this application example, the work data includes the content of work and a captured image of the workpiece 211.

The mediation server 2 which acquired the work data (Step S06) generates the game data based on the work data (Step S07). In this application example, the game data is created by converting the captured image included in the work data, and the game parameters are included in the game data. The mediation server 2 transmits the game data to the game terminal 3 (Step S08).

The game terminal 3 which acquired the game data (Step S09) applies the game data (game parameters) to the game program stored in advance, and executes the game program. At the game terminal 3, the acquired game data is applied to the game program, and the game is started. The manipulation input inputted by the game user operating the game controller 38 while playing the game is stored. Therefore, the game terminal 3 starts the game to which the game parameters are reflected (Step S10). In this application example, the game user can enjoy the shooting game in which the falling blocks are shot down.

The game terminal 3 records the history of the manipulation performed by the game user with the game controller 38 while playing the game (Step S11). When the game is ended (Step S12), the game terminal 3 transmits the game manipulation data including the history of the manipulation under the game play to the mediation server 2 (Step S13). The game manipulation data is associated with at least one of the work data and the game data.

In the robot control data generating device 43 of the mediation server 2, the game manipulation data acquiring part 43a acquires the game manipulation data (Step S14), and by the converting part 43b converting the game manipulation data using the above-described learned model, it generates the robot control data (Step S15). The game manipulation data sent to the mediation server 2 from the game terminal 3 may include the game score. The game score may become an index of the game user's skill level. When converting the game manipulation data into the robot control data, the game user's skill level may be considered.

The mediation server 2 transmits the generated robot control data to the robot 5 (Step S16). The robot 5 acquires the robot control data (Step S17), and by operating the manipulator 204 and the end effector 206 based on the robot control data, the robot 5 performs a work (Step S18). In this application example, the robot 5 performs a painting work of the workpiece 211.

Thus, in this application example, the correlativity between the content of game performed by the game user and the content of work performed by the robot 5 appears to be low. The game user performs the manipulation input to the game controller 38 while watching the virtual space projected on the display 35. That is, the game user can input the command into the robot 5 while enjoying the game, without seeing the real space where the robot 5 performs the work, and therefore, the robot 5 can be caused to work.

As described above, the robot manipulating system 1 according to this embodiment is characterized by including the game terminal 3 having the game computer 31 which executes the game program, the game controller 38 which accepts the input of the manipulation to the game computer 31, and the display 35 which displays the virtual space outputted from the game computer 31, the robot 5 which performs the work in the real space based on the robot control data, and the mediation server 2 (an "information processing device" in the claims) which mediates between the game terminal 3 and the robot 5.

The mediation server 2 includes the game data feeding part 42c which supplies to the game terminal 3 the game data associated with the content of work, the game manipulation data acquiring part 43a which acquires the game manipulation data including the history of the input of the manipulation accepted by the game controller 38 while the game program to which the game data is reflected is executed, the first converting part 43b which converts the game manipulation data into the robot control data based on the given conversion rule, and the robot control data feeding part 43c which supplies the robot control data to the robot 5.

Moreover, the robot manipulating method according to this embodiment is a robot manipulating method for manipulating, by using the game terminal 3, the robot 5 which performs the work in the real space based on the robot control data. The method is characterized by including a game program feeding step for supplying the game data associated with the content of work to the game terminal 3, a game manipulation data acquiring step for acquiring the game manipulation data including the history of the input of the manipulation accepted by the game controller 38 while the game program to which the game data is reflected is executed, a robot control data generating step for converting the game manipulation data into the robot control data based on the given conversion rule, and a robot control data feeding step for supplying the robot control data to the robot 5.

In the robot manipulating system 1, its mediation server 2, and the robot control method, which are described above, since the game manipulation data is converted into the robot control data based on the conversion rule, the contents of the computing game which the game user enjoys (i.e., characters, items, effects which appear in the virtual space of the game, the rule of the game, etc.) and the content of work performed by the robot 5 do not need to be directly related to each other. That is, the virtual space projected on the display 35 of the game terminal 3 can be turned into the world unique to the game which is greatly different from the work performed by the robot 5 in the actual world. Therefore, the aspect of amusement of the game in which the unusual virtual space is appreciated is not spoiled.

Therefore, according to the robot manipulating system 1, its mediation server 2, and the robot control method according to this embodiment, the game user who is also the robot operator can make the robot 5 work by the manipulation inputted during the game play, while purely enjoying the virtual world of the game.

In this embodiment, the mediation server 2 is further provided with the first learning part 41c which learns the relation between the game manipulation data and the robot control data by using the first learned data including the game manipulation data associated with the content of work and the robot control data, and generates the first learned model. Then, the first converting part 43b inputs the game manipulation data to the first learned model which learned the relation between the game manipulation data and the robot control data to convert the game manipulation data into the robot control data.

Similarly, in this embodiment, the robot manipulating method further includes a first learning step for learning the relation between the game manipulation data and the robot control data by using the first learned data including the game manipulation data associated with the content of work and the robot control data to generate the first learned model. Further, the robot control data generating step of the robot manipulating method includes converting the game manipulation data into the robot control data by inputting the game manipulation data to the first learned model which learned the relation between the game manipulation data and the robot control data.

Thus, by utilizing the learned model in order to convert the game manipulation data into the robot control data, the game manipulation data and the robot control data can be associated with each other with higher accuracy, even if the direct relation between the content of game and the content of work of the robot 5 is low. That is, a degree of freedom in the content of game with respect to the content of work of the robot 5 can be improved.

<Modification 1>

Figure 12:
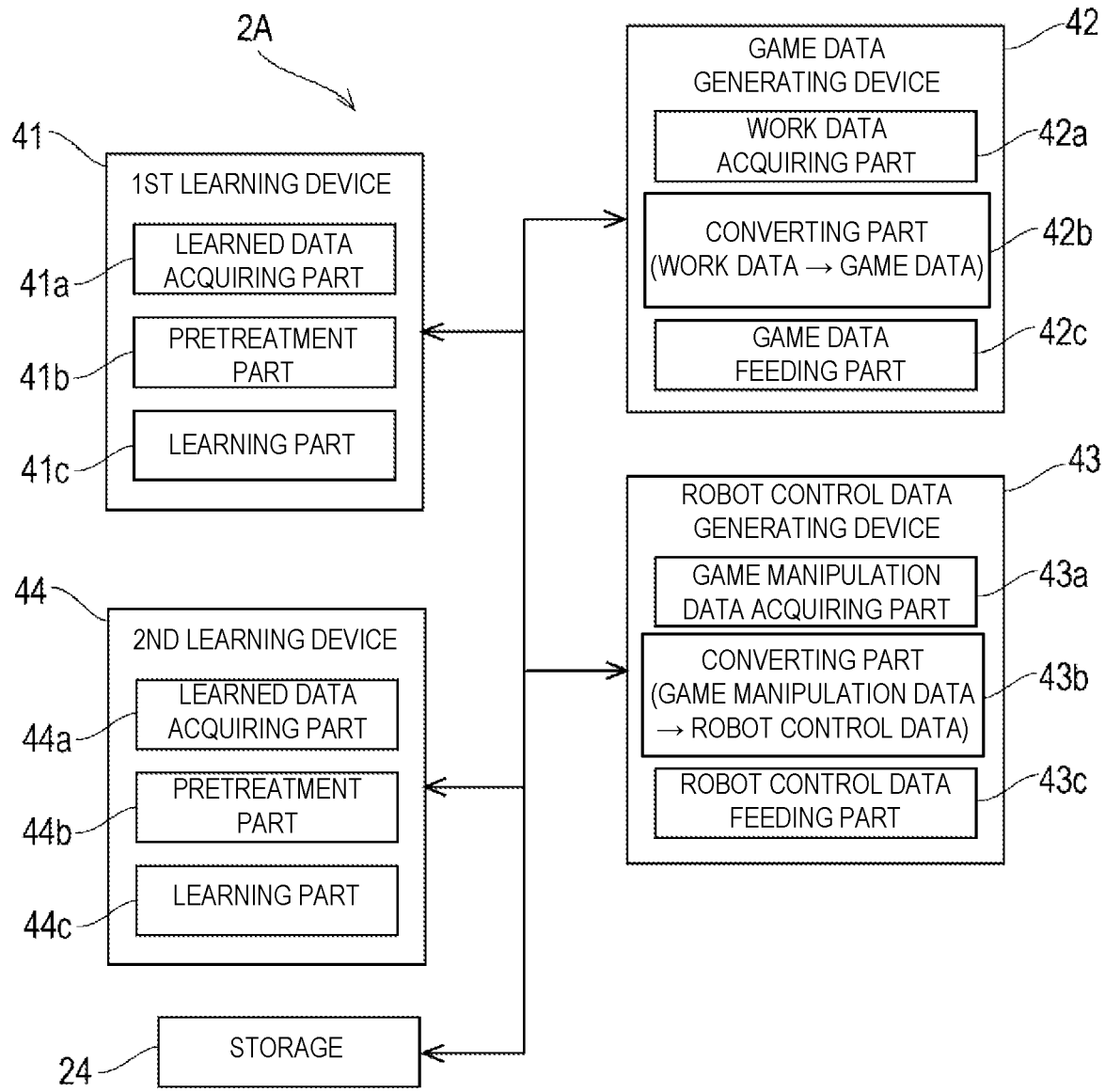
FIG. 12 is a functional block diagram of a mediation server according to Modification 1.

Next, Modification 1 of the above embodiment is described. FIG. 12 is a functional block diagram of a mediation server 2A of a robot manipulating system 1 according to Modification 1. The robot manipulating system 1 according to Modification 1 has substantially the same configuration as the above embodiment except for a second learning device 44 of the mediation server 2A. Therefore, in description of Modification 1, the second learning device 44 is described in detail, and description which overlaps with the above embodiment is omitted.

The above embodiment is provided with the second converting part 42b (game data generating part) which converts the content of work into the game data based on the given conversion rule. In this modification, the second converting part 42b also converts the work data including the content of work into the game data by utilizing the learned model (second learned model), similar to the first converting part 43b (robot control data generating part).

The mediation server 2A according to Modification 1 is the mediation server 2 according to the above embodiment further provided with the second learning device 44. Below, description of the first learning device 41, the game data generating device 42, and the robot control data generating device 43 is omitted, and the second learning device 44 is described in detail.

As illustrated in FIG. 12, the second learning device 44 includes functional parts of a learned data acquiring part 44a, a pretreatment part 44b, and a second learning part 44c. The learned data acquiring part 44a acquires a large number of learned data sets, where each learned data set is game data associated with the work data. The pretreatment part 44b pretreats the learned data set to create the teacher data set. The second learning part 44c inputs the teacher data sets into the neural network, and learns the relation between the work data which is the input data and the game data which is the output data. Various parameters set in the neural network are stored in the parameter DB. The neural network to which each parameter to be stored is set becomes the second learned model.

As described above, the mediation server 2A according to Modification 1 is provided with the second learning part 44c which learns the relation between the content of work and the game data using the second learned data including the content of work and the game data associated with the content of work, and generates the second learned model.

Further, in the mediation server 2A, the second converting part 42b (game data generating part) inputs the content of work to the second learned model which learned the relation between the content of work and the game data to convert the content of work into the game data.

Similarly, the robot manipulating method according to Modification 1 includes, in addition to the robot manipulating method according to the above embodiment, a second learning step for learning the relation between the content of work and the game data using the second learned data including the content of work and the game data associated with the content of work, and generating the second learned model. Further, in the robot manipulating method according to Modification 1, the game data generating step of the robot manipulating method according to the above embodiment includes converting the content of work into the game data by inputting the content of work to the second learned model which learned the relation between the content of work and the game data.

Thus, by converting the content of work (work data) into the game data using the learned model, the game data suitable for the content of work can be created also for a more complicated content of work. Therefore, the degree of freedom in the content of game with respect to the content of work of the robot 5 can be improved.

Application Example 2

Below, Application Example 2 in which the robot manipulating system 1 having the above configuration is applied to a robot 5A which performs a conveying work of garbage is described.

Figure 13:
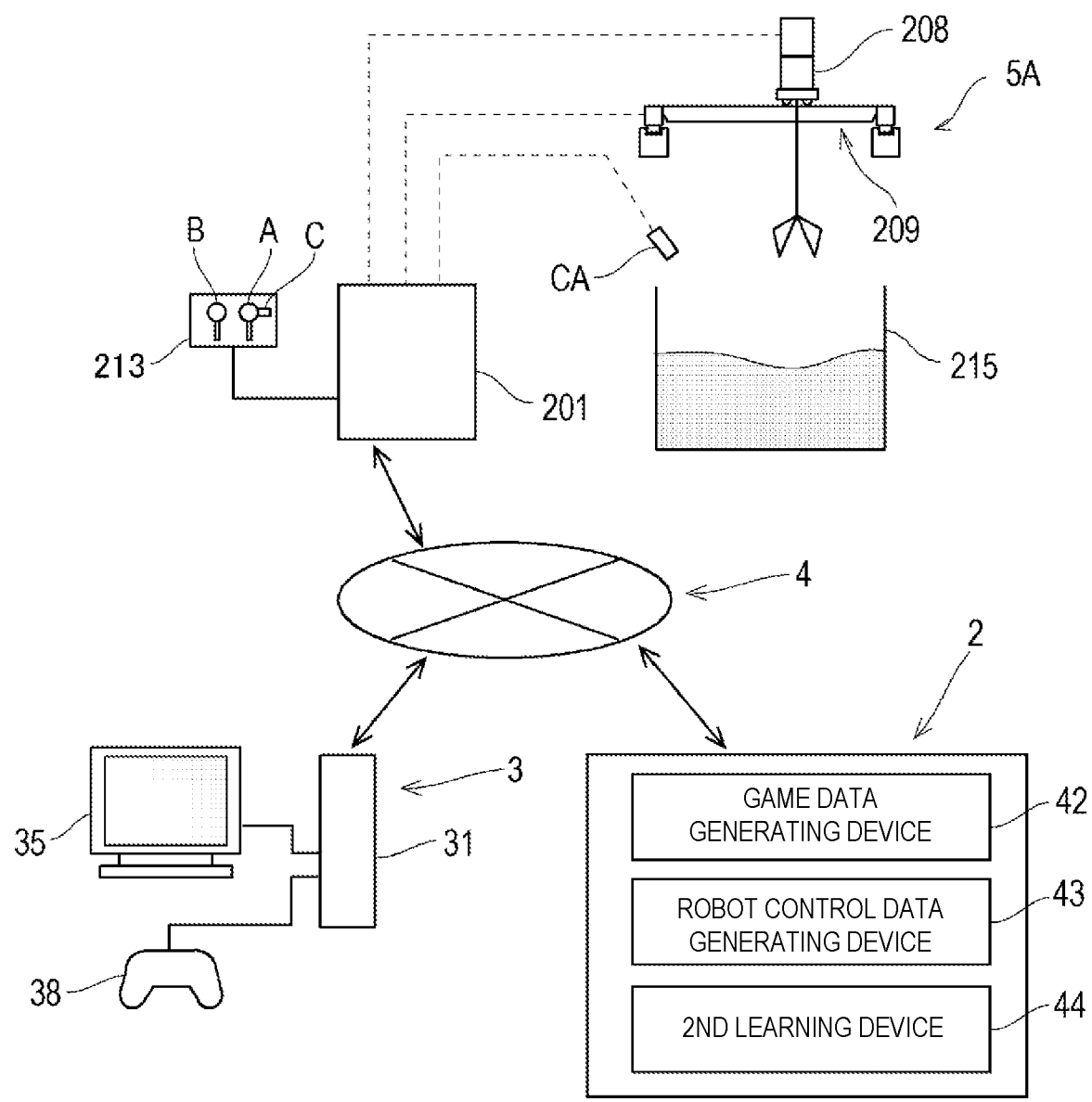
FIG. 13 is a block diagram illustrating Application Example 2 of a robot manipulating system, which illustrates the entire configuration of the robot manipulating system.

FIG. 13 is a block diagram illustrating the entire configuration of the robot manipulating system 1 according to Application Example 2. The robot 5A illustrated in FIG. 13 is a crane robot which agitates the garbage in a garbage pit 215. The robot 5A includes a crane 208, a gantry 209 which changes the position of the crane 208 in the left-and-right direction and the front-and-rear direction, and a robot controller 201 which controls operation of the crane 208 and the gantry 209. The garbage pit 215 is provided with an imaging device CA which three-dimensionally images the inside of the garbage pit 215.

The robot manipulator 213 has a first lever A, a second lever B, and a button C. According to the manipulation inputted into the first lever A and the second lever B, the gantry 209 operates and the two-dimensional position of the crane 208 changes. The first lever A can input a command of the movement of the crane 208 in the front-and-rear direction and the left-and-right direction. A manipulation input signal value inputted by the first lever A changes continuously from 0 to 1 according to the operating position of the first lever A. The second lever B can input a command of the movement of the crane 208 in the up-and-down direction. A manipulation input signal value inputted by the second lever B changes continuously from 0 to 1 according to the operating position of the second lever B. The button C can input a command for gripping the garbage by the crane 208. A manipulation input signal value inputted by the button C changes continuously from 0 to 1 according to the operating position of the button C.

The garbage in the garbage pit 215 which is a work target object of the robot 5 having the above configuration is different in the surface height and the property for different garbage, and the garbage in the garbage pit 215 must be agitated so as to become more uniform. Agitating of the garbage is performed by moving the garbage at certain coordinates in the garbage pit 215 to other coordinates. In order to efficiently perform the agitating work of the garbage, it is desirable that the movement locus of the crane 208 is shorter. The robot operator who operates the robot 5A is required for high skill of determining which coordinates of the garbage to be selected and how the garbage to be moved, and the order of movement.

Figure 14:
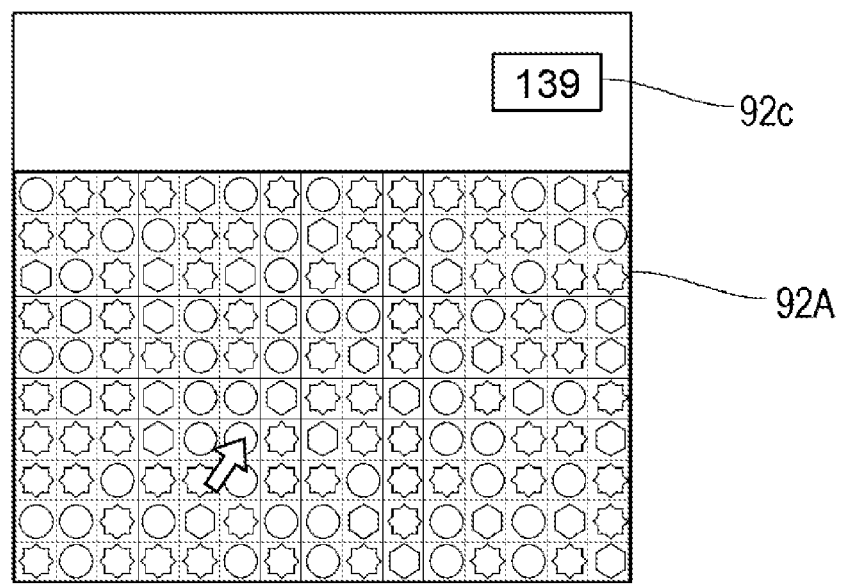
FIG. 14 is one example of the game screen displayed on the display of the game terminal in Application Example 2.

At the game terminal 3, a game program of a puzzle game is executed. FIG. 14 illustrates one example of a game screen 92A displayed on the display 35 of the game terminal 3. Not the real space where the robot 5A exists but a virtual space peculiar to the game is displayed on the game screen 92A. In the game screen 92A illustrated in FIG. 14, a grid is displayed in a center part and a panel is disposed in each cell of the grid. The panel is classified by three colors of red, blue, and purple, and if the red panel is superimposed on the blue panel, the panel changes into purple. Other panels cannot be superimposed on the red and purple panels. The game user can operate the game controller 38 to input into the game computer 31 commands related to a selection of a panel to be moved, and a moving position of the panel.

The game controller 38 is provided with a cross key X and a button Y as the manipulanda 381. A manipulation input signal value of the cross key X changes continuously from 0 to 1. The cross key X can move a pointer in the left-and-right direction and the front-and-rear direction in the game screen 92A. The manipulation input signal value of the cross key X corresponds to a moving direction and a moving amount of the pointer. A manipulation input signal value of the button Y becomes a value of 0 or 1 depending on whether the button Y is pushed. The button Y can accept an input of a command of the selection. For example, the first panel is selected when the manipulation input signal value of the button Y changes from 0 to 1 while the pointer is located on a first panel to be moved. Moreover, when the first panel is selected and the manipulation input signal value of the button Y changes from 0 to 1 while the pointer is located on a second panel of the moving destination, the first panel overlaps with the second panel. The mission is successful if the colors of all the panels become purple. The game user competes for the high score by achieving the score according to the success or failure of the mission and the smallness of the moving amount of the pointer.

The coloring pattern of the panels in the puzzle game is determined by game parameters. The game parameters are generated by the second converting part 42b converting the work data into the game parameters. In this application example, the work data includes a three-dimensional image inside the garbage pit 215 obtained by the imaging device CA. The converting part 42b converts the surface shape of deposited garbage in the garbage pit 215 into the coloring pattern of the panels under the game play by using a given conversion rule to generate the game parameters for reproducing the coloring pattern.

Figure 15:
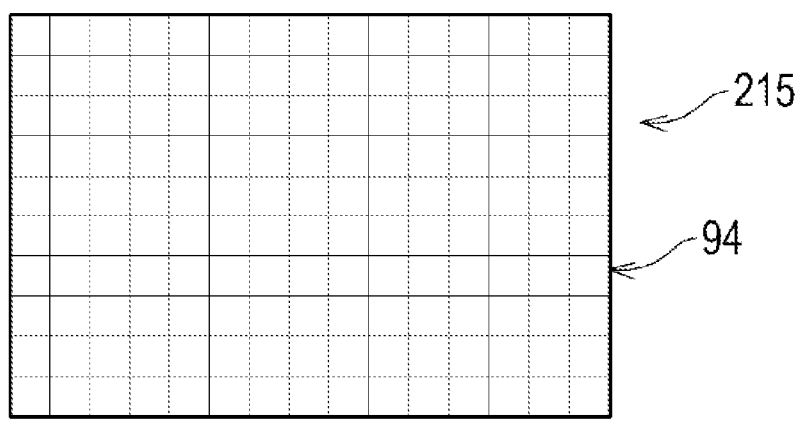
FIG. 15 is a view illustrating one example of work data in Application Example 2.

FIG. 15 is a view illustrating one example of the work data. For example, as illustrated in FIG. 15, the three-dimensional image of the garbage pit 215 obtained by the imaging device CA is converted into a planer map 94 which is comprised of a given number of dots (in the example of FIG. 15, 15×10). The height of the deposited garbage surface is classified as high, medium, and low by an analyses of the three-dimensional image, where "1" is assigned to the high dot, "0" is assigned to the medium dot, and "4" is assigned to the low dot. Further, the game parameters are generated so that the red panel appears in the dot of 1, the purple panel appears in the dot of 0, and the blue panel appears in the dot of −1. The game data includes such game parameters.

<Learning Method>

First, a learning method implemented by the second learning device 44 of the mediation server 2 is described.

A lot of learned data is prepared for learning. The learned data includes the surface shape of the deposited garbage in the garbage pit 215, and the history of the manipulation by the skilled robot operator which is associated with the surface shape. The surface shape includes the height of the deposited garbage. The skilled robot operator inputs, using the robot manipulator 213, the manipulation in the work sequence optimal to the surface shape of the deposited garbage based on his/her experiences to agitate the deposited garbage in the garbage pit 215. The robot controller 201 acquires the manipulation input signal which corresponds to an operation performed by the skilled robot operator on the robot manipulator 213, and stores the history of the manipulation input signal so as to be associated with the surface shape of the deposited garbage.

The three-dimensional image of the garbage pit 215 is converted into the planer deposited garbage map 94 which is comprised of a given number of dots (in the example of FIG. 15, 15×10). An address is assigned to each dot of the deposited garbage map 94, and each dot has information on the deposited garbage height (an average value of the dot). From the history of the manipulation input signal, the address of the dot from which the garbage in the garbage pit 215 is taken out, and the address of the dot where the garbage is placed can be obtained. The dot from which the garbage is taken out is classified as "high," the dot where the garbage is placed is classified as "low," and the dot with no movement of the garbage is classified as "medium." In a pretreatment of the learned data, "high," "medium," and "low" are given to each dot of the deposited garbage map 94 based on the foregoing rule. One set of teacher data in which the deposited garbage map 94 is used as the input data, and "high," "medium," and "low" classification of each dot of the deposited garbage map 94 is used as the output data is created.

The learning device causes the model to learn, using a lot of teacher data, which classification of "high," "medium," and "low" each dot of the deposited garbage map 94 falls. The game data generating device 42 inputs to the learned model the deposited garbage map 94 which is the work data, obtains an output of "high," "medium," and "low" classification of each dot of the deposited garbage map 94, and generates the game data based on the output.

<Robot Manipulating Method>

Then, a robot manipulating method is described.

A flow of processing of the game method is substantially the same as Application Example 1. That is, as illustrated in FIG. 11, the game terminal 3 transmits a game start request along with login information to the mediation server 2 (Step S01). If the mediation server 2 acquires the game start request (Step S02), it transmits a work data request to the robot 5A (Step S03). If the robot 5A acquires the work data request (Step S04), it transmits the work data to the mediation server 2 in response to the request (Step S05). In this application example, the work data includes the content of work and the three-dimensional image of the garbage pit 215.

The mediation server 2 which acquired the work data (Step S06) generates the game data based on the work data (Step S07). In this application example, the game data is created by converting the captured image included in the work data into the learned model, and the game data includes the game parameters. The mediation server 2 transmits the game data to the game terminal 3 (Step S08).

The game terminal 3 which acquired the game data (Step S09) applies the game data (game parameters) to the game program stored in advance, and executes the game program. At the game terminal 3, the acquired game data is applied to the game program, and the game is started. The manipulation input inputted by the game user operating the game controller 38 while playing the game is stored. Therefore, the game terminal 3 starts the game to which the game parameters are reflected (Step S10). In this application example, the game user can enjoy the color puzzle game in which the blue and red panels are turned into purple.

The game terminal 3 records the history of the manipulation performed by the game user using the game controller 38 while playing the game (Step S11). If the game is ended (Step S12), the game terminal 3 transmits the game manipulation data including the history of the manipulation under the game play to the mediation server 2 (Step S13). The game manipulation data is associated with at least one of the work data and the game data.

In the robot control data generating device 43 of the mediation server 2, the game manipulation data acquiring part 43a acquires the game manipulation data (Step S14), and the converting part 43b converts the game manipulation data into the robot control data to generate the robot control data (Step S15). In this application example, the game manipulation data includes a combination of the coordinates of the panel to be moved and the coordinates of the destination of the movement of the panel, and the moving order of the panels. From such game manipulation data, the robot control data including the combination of the coordinates from which the garbage is taken out and the coordinates into which the garbage is carried, and the moving order of the garbage in the garbage pit 215 is generated.

The mediation server 2 transmits the generated robot control data to the robot 5A (Step S16). The robot 5A acquires the robot control data (Step S17) and operates the gantry 209 and the crane 208 based on the robot control data so that the robot 5A performs the work (Step S18). In this application example, the robot 5A performs the agitating work of the garbage pit 215.

Thus, although in this application example the content of game performed by the game user and the content of work performed by the robot 5A are not directly related to each other, there is a correlativity between the movement of the pointer in the game and the movement of the crane 208. However, the game user can perform the manipulation input to the game controller 38 while looking at the virtual space projected on the display 35, without seeing the real space where the robot 5A performs the work so that he/she can input the command into the robot 5A while enjoying the game to cause the robot 5A to perform the work.

Although the suitable embodiment of the present disclosure is described above, what changed the concrete structures and/or functions of the above embodiment without departing from the thought of the present disclosure may be encompassed within the present disclosure. The above-described robot manipulating system 1 and robot manipulating method can be change as follows.

For example, although in the above embodiment the game terminal 3, the mediation server 2, and the robots 5 and 5A are independent devices, the function of the mediation server 2 may be provided to one of the game terminal 3 and the robots 5 and 5A.

For example, although in the above embodiment the neural network model performs the learning as one example of the learning model, the learning algorithm is not limited to this configuration. For example, other models different from the neural network model may perform the learning by other learning methods.

For example, in the above embodiment, the game program is stored (installed) in the game terminal 3 in advance. Although the game program is supplied to the game terminal 3 from the mediation server 2 through the communication apparatus 4, it may be recorded on a recording medium, such as a CD-ROM, a DVD-ROM, and a micro SD card and may be provided to the game terminal 3. Moreover, the game program is not limited to the configuration in which it is stored in the game terminal 3 in advance, but the game program to which the game parameters are applied in advance may be supplied to the game terminal 3 from the mediation server 2 each time he/she plays the game. In this case, the game data includes the game program to which the game parameters are applied.

DESCRIPTION OF REFERENCE CHARACTERS

1: Robot Manipulating System
2, 2A: Mediation Server (One Example of Information Processing Device)
3: Game Terminal
4: Communication Apparatus
5, 5A: Robot
20a: Calculation Controller
20b: Interface
21: Processor
22: Memory
24: Storage
25: I/O Part
31: Game Computer
35: Display
37: Speaker
38: Game Controller
41: First Learning Device
41a: Learned Data Acquiring Part
41b: Pretreatment Part
41c: First Learning Part
42: Game Data Generating Device
42a: Work Data Acquiring Part
42b: Converting Part (Second Converting Part)
42c: Game Data Feeding Part
43: Robot Control Data Generating Device
43a: Game Manipulation Data Acquiring Part
43b: Converting Part (First Converting Part)
43c: Robot Control Data Feeding Part
44: Second Learning Device
44a: Learned Data Acquiring Part
44b: Pretreatment Part
44c: Second Learning Part
91: Map
92: Game Screen
92a: Line
92b: Shooting Gun
92c: Score
201: Robot Controller
202: Paint Feeder
203: Valve Device
204: Manipulator
205: Compressor
206: End Effector
206A: Painting Gun
207: Nozzle
208: Crane
209: Gantry
210: Jig
211: Workpiece
213: Robot Manipulator
215: Garbage Pit
311: Main Processor
312: Sound Processor
313: I/O Processor
314: Storage
315: Graphics Processor
316: Memory
381: Manipulandum
382: Manipulation Detector
383: Communication Device

The invention claimed is:

1. An information processing device configured to mediate between a game terminal having a game computer configured to execute a game program, a game controller configured to accept an input of manipulation into the game computer, and a display configured to display a virtual space outputted from the game computer, and a robot configured to perform a work in a real space based on robot control data, comprising:
a second converting circuitry configured to convert work data that includes the content of work into game data based on a given conversion rule;
a game data feeding circuitry configured to supply the game data to the game terminal;
a game manipulation data acquiring circuitry configured to acquire game manipulation data including a history of the input of the manipulation accepted by the game controller while the game program to which the game data is reflected is executed;

a first converting circuitry configured to convert the game manipulation data into the robot control data based on a given conversion rule; and
a robot control data feeding circuitry configured to supply the robot control data to the robot,
wherein the second converting circuitry converts the content of work into the game data by inputting the content of work into a second learned model where a relation between the content of work and the game data is learned.

2. The information processing device of claim 1, wherein the first converting circuitry converts the game manipulation data into the robot control data by inputting the game manipulation data into a first learned model where a relation between the game manipulation data and the robot control data is learned.

3. The information processing device of claim 2, further comprising a first learning circuitry configured to learn the relation between the game manipulation data and the robot control data by using first learned data including the game manipulation data associated with the content of work and the robot control data, and generate the first learned model.

4. The information processing device of claim 1, further comprising a second learning circuitry configured to learn the relation between the content of work and the game data by using second learned data including the content of work and the game data associated with the content of work, and generate the second learned model.

5. A robot manipulating system, comprising:
a game terminal having a game computer configured to execute a game program, a game controller configured to accept an input of manipulation into the game computer, and a display configured to display a virtual space outputted from the game computer;
a robot configured to perform a work in a real space based on robot control data; and
the information processing device of claim 1 configured to mediate between the game terminal and the robot.

6. A method of manipulating a robot configured to perform a work in a real space based on robot control data by using a game terminal having a game computer configured to execute a game program, a game controller configured to accept an input of manipulation into the game computer, and a display configured to display a virtual space outputted from the game computer, the method comprising the steps of:
converting work data that includes the content of work into game data based on a given conversion rule;
supplying the game data to the game terminal;
acquiring game manipulation data including a history of the input of the manipulation accepted by the game controller while the game program to which the game data is reflected is executed;
converting the game manipulation data into the robot control data based on a given conversion rule; and
supplying the robot control data to the robot,
wherein the converting the content of work includes converting the content of work into the game data by inputting the content of work into a second learned model where a relation between the content of work and the game data is learned.

7. The method of claim 6, wherein the converting the game manipulation data includes converting the game manipulation data into the robot control data by inputting the game manipulation data into a first learned model where a relation between the game manipulation data and the robot control data is learned.

8. The method of claim 7, further comprising generating the first learned model by learning the relation between the game manipulation data and the robot control data by using first learned data including the game manipulation data associated with the content of work and the robot control data.

9. The method of claim 6, further comprising generating the second learned model by learning the relation between the content of work and the game data by using second learned data including the content of work and the game data associated with the content of work.

* * * * *